United States Patent
Masutani et al.

(10) Patent No.: US 7,315,340 B2
(45) Date of Patent: Jan. 1, 2008

(54) TRANSFLECTIVE LIQUID CRYSTAL DISPLAY DEVICE

(75) Inventors: Yuichi Masutani, Tokyo (JP); Shingo Nagano, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 113 days.

(21) Appl. No.: 11/276,136

(22) Filed: Feb. 15, 2006

(65) Prior Publication Data

US 2006/0279676 A1    Dec. 14, 2006

(30) Foreign Application Priority Data

Jun. 13, 2005 (JP) .............. 2005-172132

(51) Int. Cl.
G02F 1/1335    (2006.01)
(52) U.S. Cl. .................................. 349/114
(58) Field of Classification Search ........ 349/113–114, 349/39, 44
See application file for complete search history.

(56) References Cited

U.S. PATENT DOCUMENTS

| | | |
|---|---|---|
| 6,195,140 B1 | 2/2001 | Kubo et al. |
| 6,452,656 B2 | 9/2002 | Niwano et al. |
| 6,686,986 B2 | 2/2004 | Niwano et al. |
| 6,831,715 B2 | 12/2004 | Ikeno et al. |
| 6,864,939 B2 | 3/2005 | Niwano et al. |
| 7,242,447 B2 * | 7/2007 | Nakano et al. ............. 349/114 |
| 2002/0033918 A1 | 3/2002 | Shigeno et al. |
| 2004/0207792 A1 | 10/2004 | Wu |
| 2005/0151914 A1 | 7/2005 | Niwano et al. |
| 2006/0050213 A1 | 3/2006 | Masutani et al. |

FOREIGN PATENT DOCUMENTS

| | | |
|---|---|---|
| CN | 1782799 A | 6/2006 |
| JP | 7-230101 | 8/1995 |
| JP | 11-212119 | 8/1999 |
| JP | 2000-19563 | 1/2000 |
| JP | 2000-258802 | 9/2000 |
| JP | 2001-350158 | 12/2001 |
| JP | 2003-57639 | 2/2003 |
| JP | 2003-195329 | 7/2003 |
| JP | 2003-344840 | 12/2003 |
| JP | 2004-046223 | 2/2004 |
| JP | 2004-109597 | 4/2004 |
| JP | 2004-157148 | 6/2004 |
| JP | 2004-163461 | 6/2004 |
| JP | 2004-212532 | 7/2004 |
| JP | 2004-240268 | 8/2004 |
| JP | 2005-292660 | 10/2005 |

(Continued)

*Primary Examiner*—James A. Dudek
(74) *Attorney, Agent, or Firm*—Oblon, Spivak, McClelland, Maier & Neustadt, P.C.

(57) ABSTRACT

The present invention provides a transflective liquid crystal display device that has reflective contrast reduction preventing electrodes formed in given positions and that is capable of preventing bright dot defects while preventing reduction of reflective contrast. In a reflective region in a pixel region, a reflective electrode is formed in the same layer as source bus lines and separated by given spaces from the source bus lines. Reflective contrast reduction preventing electrodes are formed above the given spaces and have areas overlapping the reflective electrode in plane view, with an insulating film formed between them. The reflective contrast reduction preventing electrodes are in an electrically floating state.

6 Claims, 11 Drawing Sheets

FOREIGN PATENT DOCUMENTS

| | | |
|---|---|---|
| JP | 2005-292661 | 10/2005 |
| JP | 2006-041161 | 2/2006 |
| JP | 2006-78643 | 3/2006 |
| KR | 2002-0037891 | 5/2002 |
| KR | 2002-0091897 | 12/2002 |

* cited by examiner

F I G . 1
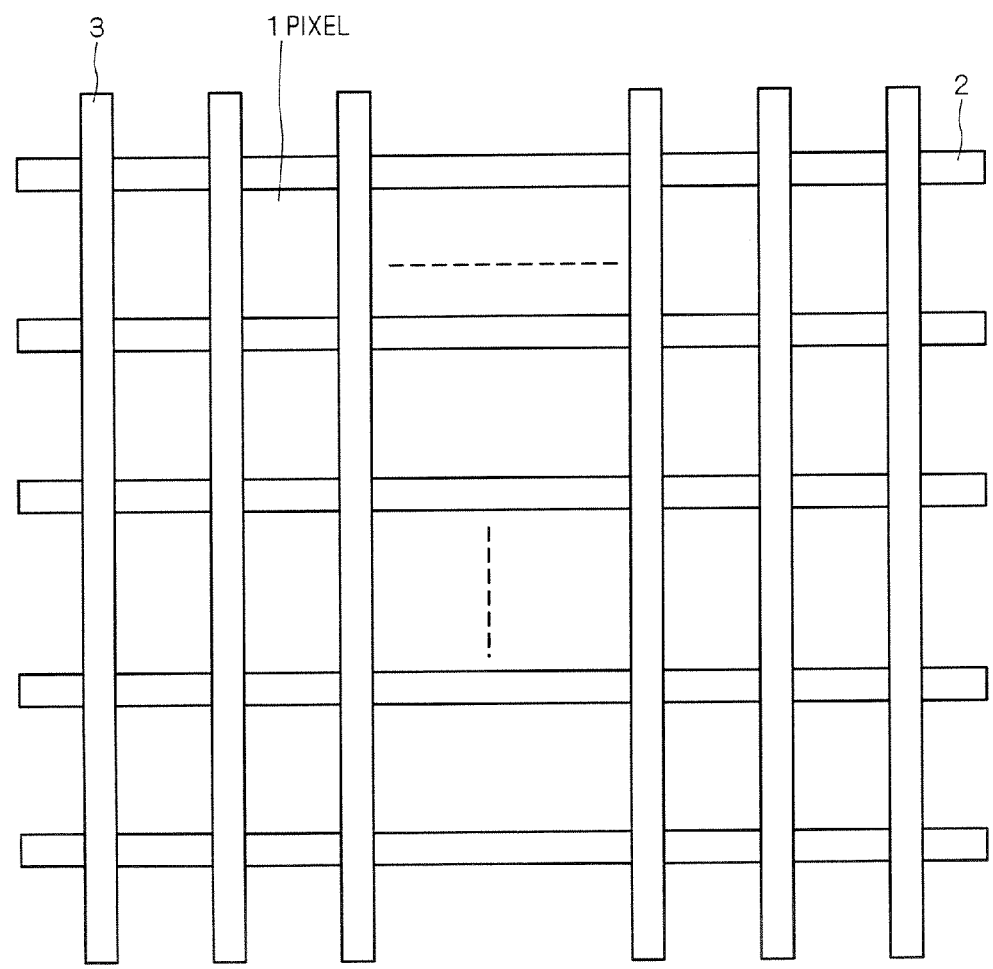

F I G . 4
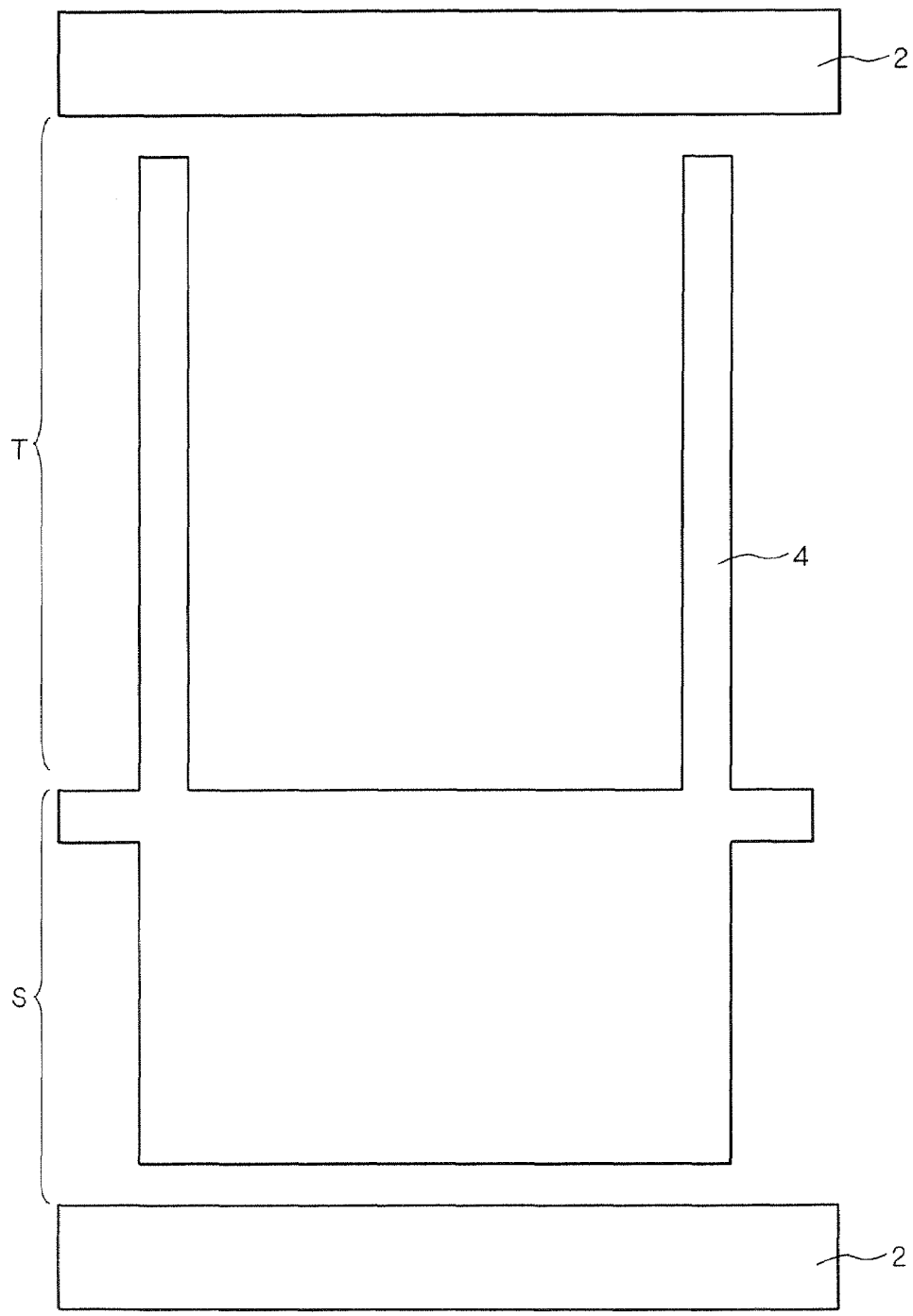

F I G . 5
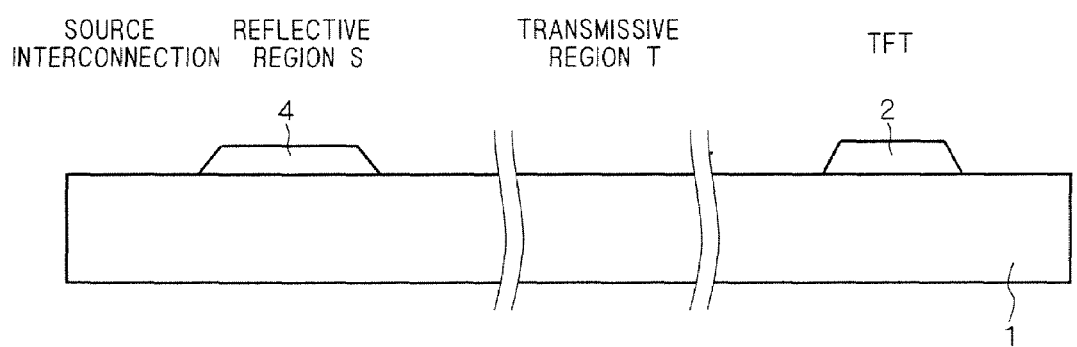

TRANSFLECTIVE LIQUID CRYSTAL DISPLAY DEVICE

BACKGROUND OF THE INVENTION

1. Field of the Invention

The present invention relates to a transflective liquid crystal display device having a transmissive region transmitting backlight and a reflective region reflecting ambient light that are formed in pixel region.

2. Description of the Background Art

A transflective liquid crystal display device has a TFT (Thin Film Transistor) array substrate. On the array substrate, each pixel has a transmissive region that transmits backlight emitted from the rear side of the display surface and a reflective region that reflects ambient light coming into the liquid crystal layer.

In a conventional technique for transflective liquid crystal display devices thus structured, reflective electrodes in the reflective regions, source bus lines (including source electrodes), and drain electrodes are formed in the same layer (see Japanese Patent Application No. 2004-110299, which is hereinafter referred to as Patent Document 1). Application of the technique of Patent Document 1 simplifies the manufacturing process.

The transflective liquid crystal display device according to the Patent Document 1 requires preventing short-circuits between the source bus lines and reflective electrodes. Accordingly, the source bus lines and reflective electrodes, formed in the same layer, are separated away from each other by given spaces (distances).

In the transflective liquid crystal display device of the Patent Document 1, a storage capacitance electrode and storage capacitance bus line exist under the interval between a source bus line and a reflective electrode. Thus, in the transflective liquid crystal display device, the storage capacitance electrode and storage capacitance bus line face the opposing electrode provided on the opposing substrate placed opposite the TFT array substrate.

In the transflective liquid crystal display device of Patent Document 1, the storage capacitance electrode and storage capacitance bus line are at the same potential as the opposing electrode. Accordingly, no electric field is applied to the liquid crystal layer above the interval (the given space (distance)) between the source bus line and the reflective electrode. Then, it is not possible to control, with an electric field, the light entering the display area and reflected at the storage capacitance electrode and the like existing under that interval.

Accordingly, when the transflective liquid crystal display device of the Patent Document 1 adopts a normally white mode (a mode which displays white when no voltage is applied), the reflectivity is increased in display of black because the reflected light cannot be controlled with an electric field, which leads to reduction of reflective contrast.

Japanese Patent Application No. 2004-260873 (hereinafter referred to as Patent Document 2) discloses a transflective liquid crystal display device that solves this problem.

According to the technique of Patent Document 2, a reflective contrast reduction preventing electrode is formed in order to allow application of an electric field to the liquid crystal layer above the interval between the source bus line and the reflective electrode. Accordingly, the transflective liquid crystal display device of Patent Document 2 prevents the reduction of reflective contrast.

Now, the reflective contrast reduction preventing electrode is electrically connected with a transmissive pixel electrode formed in the transmissive region.

In the transflective liquid crystal display device of the Patent Document 2, when conductive foreign matter enters between the reflective contrast reduction preventing electrode and the opposing electrode, or when the opposing electrode is deformed during manufacturing process, for example, the opposing electrode and the reflective contrast reduction preventing electrode may be short-circuited.

Then, because the reflective contrast reduction preventing electrode is electrically connected to the transmissive pixel electrode as mentioned above, the transmissive pixel electrode and the opposing electrode may be electrically short-circuited as a result (hereinafter a short-circuit of this kind is referred to as an inter-surface short-circuit).

If an inter-surface short-circuit occurs, no electric field is applied to the liquid crystal layer in the area corresponding to the short-circuited portion. In a normally white mode device, the absence of electric field application to the liquid crystal layer in a transmissive region allows the backlight to come out through the display area. The backlight coming out through the display area results in a very noticeable defect called "a bright dot defect".

In addition, in the transflective liquid crystal display device of the Patent Document 2, the reflective contrast reduction preventing electrode must be formed in the reflective region near a border between pixels. However, in general, the cell gap is narrow in the area where the reflective contrast reduction preventing electrode is formed. Therefore, the transflective liquid crystal display device of the Patent Document 2 is susceptible to inter-surface short-circuiting caused by contamination by foreign matter.

Furthermore, the reflective contrast reduction preventing electrode is formed near a border of the color filter pattern formed on the opposing substrate. Accordingly, the transflective liquid crystal display device of Patent Document 2 is susceptible also to inter-surface short-circuiting caused by abnormalities of the color filter pattern (abnormalities of the color filter pattern cause deformation of the opposing electrode).

That is, the transflective liquid crystal display device of Patent Document 2 is prone to bright dot defects because of the positioning of the reflective contrast reduction preventing electrodes, which leads to reduction of yield and hence to increased manufacturing costs.

SUMMARY OF THE INVENTION

An object of the present invention is to provide a transflective liquid crystal display device in which source bus lines and reflective pixel electrodes are formed in the same layer and separated at given intervals, and reflective contrast reduction preventing electrodes are formed in given positions in order to prevent reduction of reflective contrast, for example, and the transflective liquid crystal display device is capable of preventing formation of bright dot defects while maintaining the reflective contrast reduction prevention.

According to the present invention, a transflective liquid crystal display device includes a first substrate, a second substrate, and a liquid crystal layer. The second substrate is provided facing the first substrate. The liquid crystal layer is sandwiched between the first substrate and the second substrate. The first substrate has a plurality of gate bus lines, a plurality of source bus lines, a reflective electrode, and at least one reflective contrast reduction preventing electrode.

The gate bus lines are formed on the first substrate. The source bus lines are formed on the first substrate and intersect with the gate bus lines in plane view. The reflective electrode is formed in a reflective region that is a part of a unit pixel region sectioned by the gate bus lines and the source bus lines, and the reflective electrode is formed in the same layer as the source bus lines and separated by given spaces from the source bus lines. The reflective contrast reduction preventing electrode is formed in an upper layer above the reflective electrode in the given spaces and overlaps the reflective electrode in plane view, with a first insulating film interposed between them. The reflective contrast reduction preventing electrode is in an electrically floating state.

Even when the reflective contrast reduction preventing electrode is short-circuited with an opposing electrode formed on the second substrate, the opposing electrode is not electrically short-circuited with a transmissive electrode (that is, an inter-surface short-circuit is prevented). This prevents formation of very noticeable defects called bright dot defects. In other words, the transflective liquid crystal display device allows manufacture with high yield. The reflective contrast reduction preventing electrode forms a capacitance with the reflective electrode. Accordingly, a voltage can be applied to the reflective contrast reduction preventing electrode on the basis of the capacitance. This allows normal application of an electric field to the liquid crystal layer above the given spaces mentioned above, which prevents reduction of reflective contrast in the given spaces.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a plane view schematically illustrating the structure of a TFT array substrate;

FIG. 4 is a plane view used to describe a method of manufacturing a transflective liquid crystal display device according to a first preferred embodiment;

FIG. 5 is a cross-sectional view used to describe the method of manufacturing the transflective liquid crystal display device according to the first preferred embodiment;

DESCRIPTION OF THE PREFERRED EMBODIMENTS

The present invention will now be specifically described referring to the diagrams illustrating the preferred embodiments.

First Preferred Embodiment

FIG. 1 is a plane view schematically illustrating the structure of a TFT (Thin Film Transistor) array substrate of a transflective liquid crystal display device according to a first preferred embodiment.

As shown in FIG. 1, a plurality of gate bus lines 2 are disposed in stripes on a transparent insulative substrate (not shown, which is regarded as a first substrate). Also on the transparent insulative substrate, a plurality of source bus lines 3 are disposed in stripes intersecting with the gate bus lines 2 in plane view.

The areas sectioned by the gate bus lines 2 and source bus lines 3 form pixel regions (i.e., unit pixels). As shown in FIG. 1, the unit pixel regions (hereinafter referred to simply as pixel regions) are disposed in a matrix.

Figure 2:
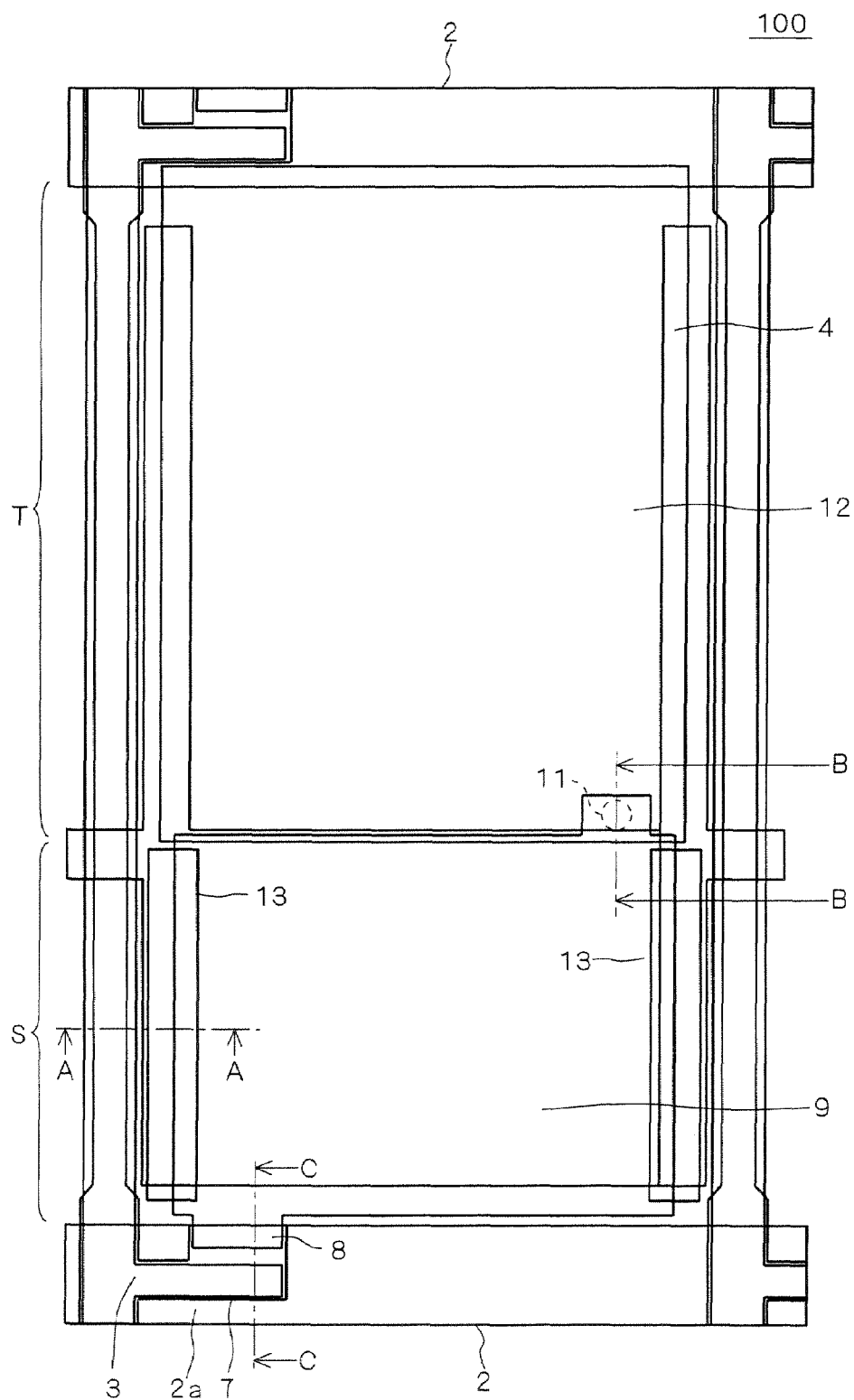
FIG. 2 is an enlarged plane view showing the structure of one pixel region of the TFT array substrate.
Figure 3:
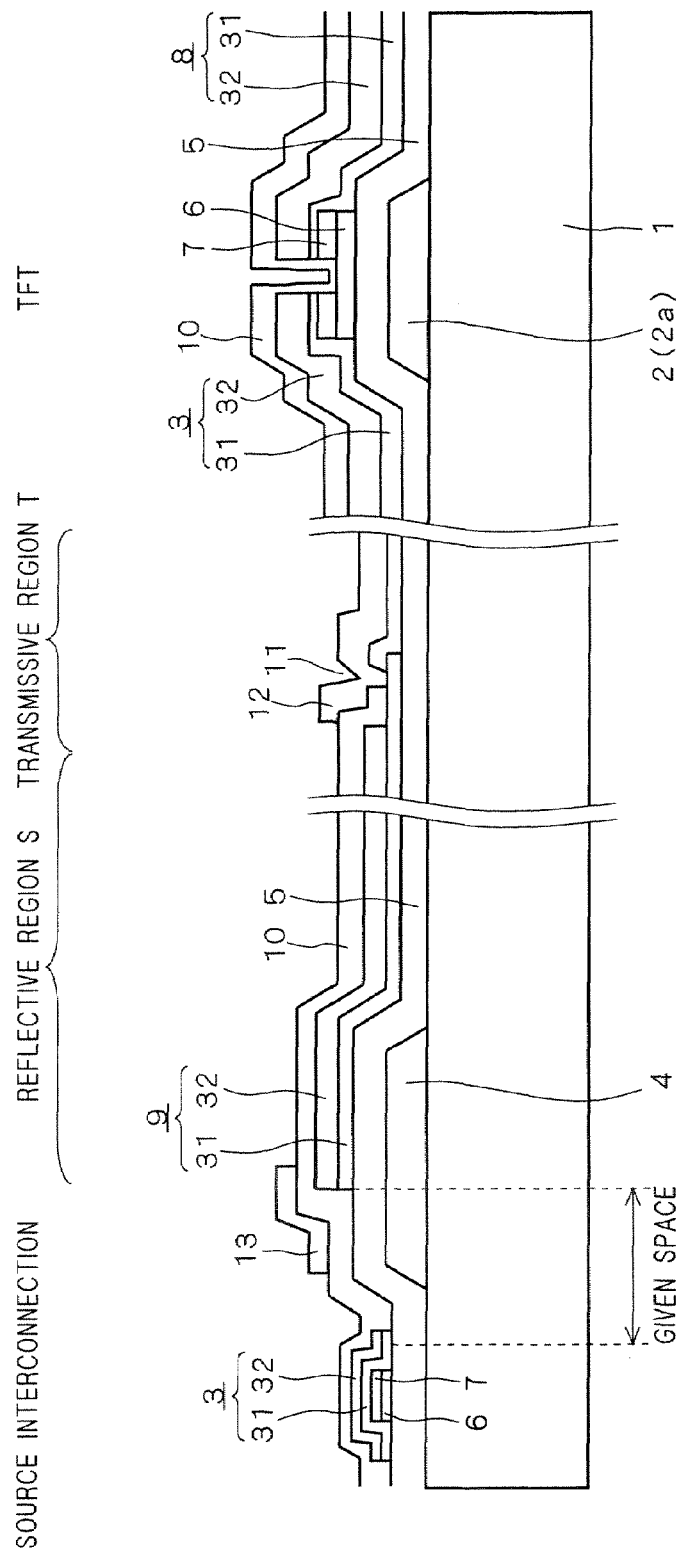
FIG. 3 is a cross-sectional view showing the structure of the TFT array substrate.

FIG. 2 is a plane view showing one pixel of the TFT array substrate of FIG. 1 in an enlarged manner. FIG. 3 shows sections of the TFT array substrate 100 of FIG. 2, including a section taken along line A-A (from a source electrode to a reflective region), a section taken along line B-B (a contact between a transmissive region and reflective region), and a section taken along line C-C (a TFT and its vicinity).

The structure of the transflective liquid crystal display device (particularly, the TFT array substrate) according to this preferred embodiment will be described below referring to FIGS. 2 and 3.

As shown in FIG. 2, each pixel includes a transmissive region (regarded as a first region) T that transmits light emitted within the liquid crystal display device and a reflective region (regarded as a second region) S that reflects ambient light entering the liquid crystal display device from the outside.

As can be seen from FIGS. 2 and 3, a gate bus line 2, which is made of a first conductive film, exists on the transparent insulative substrate 1, e.g., a glass substrate. Particularly, the part of the gate bus line 2 where the TFT is formed is referred to as a gate electrode area 2a.

A storage capacitance electrode 4, made of the first conductive film, is also formed on the transparent insulative substrate 1. The storage capacitance electrode 4 has a function of holding voltage for a given period. The storage capacitance electrode 4 also has a function of preventing leakage of light from the backlight.

An insulating film 5 is formed to cover the gate bus line 2 and the storage capacitance electrode 4 on the transparent insulating substrate 1. A semiconductor active film 6 and an ohmic contact film 7, which are semiconductor layers, are formed in the gate electrode area 2a, with the insulating film 5 (regarded as a gate insulating film) existing between them.

Part of the ohmic contact film 7 is removed and the ohmic contact film 7 is thus divided into two regions. In one region, a source bus line 3, made of a second conductive film, is placed on the ohmic contact film 7. In the other region, a drain electrode 8, made of the second conductive film, is placed on the ohmic contact film 7. Particularly, the part of the source bus line 3 where the TFT is formed is referred to as a source electrode area.

The gate electrode 2a, the semiconductor active film 6, the source electrode area, and the drain electrode 8 form the TFT as a switching element. The source bus line 3, part of which forms the source electrode area, intersects with the gate bus line 2, with the insulating film 5 existing between them. The semiconductor active film 6 and the ohmic contact film 7 are formed at the intersection and in the area for the formation of the source bus line 3, in order to enhance the breakdown voltage.

In the reflective region S, a reflective electrode 9 extends from the drain electrode 8. That is, the drain electrode 8 and the reflective electrode 9 are formed as one piece. The reflective electrode 9 is therefore formed of the second conductive film.

Considering the function of the reflective electrode 9, its outermost surface layer must be a metal film having a high reflectivity. Accordingly, at least the outermost surface layer of the second conductive film is made of a relatively high-reflectivity metal film.

The reflective electrode 9 and the source bus lines 3 are formed in the same layer. Accordingly, to prevent short-circuiting between the reflective electrode 9 and the source bus lines 3, the reflective electrode 9 must be separated from the source bus lines 3 by a given space (distance). Preferably, the source bus lines 3 and the reflective electrode 9 are formed at intervals of about 5 μm to 10 μm.

In the liquid crystal display device of this preferred embodiment, an insulating film 10 is formed to cover the components described above. Part of the insulating film 10 on the reflective electrode 9 is removed to form a contact hole 11 in the insulating film 10. The reflective electrode 9 is exposed at the bottom of the contact hole 11.

In the transmissive region T, a transmissive electrode 12 having a given pattern is formed on the insulating film 10. The transmissive electrode 12 is made of a conductive film having a relatively high transmissivity (hereinafter referred to as a transparent conductive film). The transmissive electrode 12 is electrically connected to the reflective electrode 9 through the contact hole 11. Accordingly, the transmissive electrode 12 is electrically connected to the drain electrode 8.

Also, reflective contrast reduction preventing electrodes 13 are formed above the given spaces between the source bus lines 3 and the reflective electrode 9, with the insulating film 10 existing between them. In plane view, the reflective contrast reduction preventing electrodes 13 have areas that overlap the reflective electrode 9.

The reflective contrast reduction preventing electrodes 13 are members that are provided to allow application of an electric field to the liquid crystal layer above the intervals between the source bus lines 3 and the reflective electrode 9, and the formation of the reflective contrast reduction preventing electrodes 13 prevents reduction of reflective contrast. The reflective contrast reduction preventing electrodes 13 are made of a conductive film having transparency.

As shown in FIG. 2, the reflective contrast reduction preventing electrodes 13 extend along the source bus lines 3. That is, the direction of formation of the reflective contrast reduction preventing electrodes 13 and the direction of formation of the source bus lines 3 are approximately parallel with each other.

Also, in the liquid crystal display device of the invention, the reflective contrast reduction preventing electrodes 13 are not electrically connected to the transmissive electrode 12 and the like. That is, the reflective contrast reduction preventing electrodes 13 are electrically in a floating state.

Furthermore, as shown in FIG. 3, the reflective contrast reduction preventing electrode 13 has an area that overlaps the storage capacitance electrode 4 in plane view, with the insulating films 5 and 10 existing between them.

Next, a method of manufacturing the liquid crystal display device of this preferred embodiment will be specifically described referring to the drawings. The cross-sectional views illustrating the process steps show the A-A section (the source electrode and reflective region), the B-B section (the vicinity of the contact between the transmissive region and reflective region) and the C-C section (the TFT and its vicinity) of the TFT array substrate 100 shown in FIG. 2.

First, the transparent insulative substrate 1, e.g., a glass substrate, is cleaned to clean up the surface of the transparent insulative substrate 1. Next, the first conductive film is formed on the transparent insulative substrate 1 by, e.g., sputtering.

For example, the first conductive film may be a thin film of Cr (chromium), Mo (molybdenum), Ta (tantalum), Ti (titanium), or Al (aluminum), or a thin film of an alloy mainly containing any of these metals. In this preferred embodiment, a Cr film having a thickness of about 400 nm is formed as the first conductive film.

By the way, after the formation of the first conductive film, the contact hole 11 is formed by dry-etching in a process step described later. A transparent conductive film is formed in the contact hole 11 in order to obtain an electric connection. During the formation of the contact hole 11, the first conductive film may be oxidized.

Accordingly, it is preferable to form the first conductive film with a thin metal film insusceptible to surface oxidation, or a thin metal film capable of maintaining relatively high conductivity even when oxidized.

For example, when Al-based material is adopted as the first conductive film, an Al nitride film is formed on the surface or a film of Cr, Mo, Ta, or Ti is formed on the surface, in order to prevent surface oxidation and hence deterioration of conductivity.

Subsequently, a photolithography process is applied to the first conductive film to pattern the first conductive film into given shape. Thus, as shown in the plane view of FIG. 4 and the cross-sectional view of FIG. 5, the gate bus lines 2 and the storage capacitance electrode 4 are formed on the transparent insulative substrate 1.

The storage capacitance electrode 4 is formed in almost the entire area of the reflective region S. In the transmissive region T, the storage capacitance electrode 4 is formed as lines having a given width near and along the source bus lines 3 formed later.

The sequence of the photolithography process steps is performed as shown below. First, the transparent insulative substrate 1, having the first conductive film formed thereon, is cleaned, and photosensitive resist is applied to the transparent insulative substrate 1. Next, the resist is dried, and exposed through a mask having a predetermined pattern, which is followed by a development. A predetermined resist pattern is thus formed. The patterned resist is heated and cured, and the first conductive film is etched using the resist as a mask. The resist is then peeled off.

The etching of the first conductive film may be achieved by wet-etching using a known etchant. For example, when the first conductive film is made of Cr, a solution containing a mixture of second cerium ammonium nitrate and nitric acid is used.

During the etching of the first conductive film, it is necessary to obtain enhanced insulating-film coverage at stepped pattern edges and to prevent short-circuiting with other bus lines at the stepped portions. Accordingly, it is preferable to etch the first conductive film so that the pattern edges are tapered to form trapezoidal shape in cross section.

Next, the insulating film 5, semiconductor active film 6, and ohmic contact film 7 are sequentially formed on the transparent insulative substrate 1, thus covering the gate bus lines 2 and the storage capacitance electrode 4. The films 5, 6, and 7 may be formed by plasma CVD (Chemical Vapor Deposition), for example.

The insulating film 5 serves as a gate insulating film in the area for the formation of the TFT. The insulating film 5, serving as a gate insulating film, may be made as a single-layered film of SiNx, SiOy, or SiOzNw, or a multi-layered film including such films. The characters "x", "y", "z", and "w" are positive numbers that represent stoichiometric compositions.

When the insulating film 5 is too thin, the gate bus lines 2 and the source bus lines 3 may be short-circuited at their intersections. On the other hand, when the insulating film 5 is too thick, the on-state current of the TFT is reduced and display characteristic is deteriorated. The thickness of the insulating film 5 is therefore determined according to the trade-off.

Preferably, the insulating film 5 is formed through a plurality of process steps. This is because, when the insulating film 5 is formed in a single step, defects like pinholes may be formed to cause interlayer short-circuits. For example, the insulating film 5 is formed to a thickness of about 400 nm by forming an about 300-nm-thick SiN film and then forming an about 100-nm-thick SiN film.

The semiconductor active film 6 may be a film of amorphous silicon (a-Si) or a film of polysilicon (p-Si), for example. When the semiconductor active film 6 is too thin, the semiconductor active film 6 will disappear during a dry-etching process of the ohmic contact film 7 described later. On the other hand, when the semiconductor active film 6 is too thick, the on-state current of the TFT is reduced.

Accordingly, the thickness of the semiconductor active film 6 must be determined by considering the controllability of the amount of dry-etching of the ohmic contact film 7 and the desired on-state current value of the TFT. For example, when the semiconductor active film 6 is made of a film of a-Si, it is preferably formed to a thickness of about 150 nm.

The ohmic contact film 7 may be an n-type a-Si film slightly doped with P (phosphorus), or an n-type p-Si film slightly doped with P (phosphorus). For example, the thickness of the ohmic contact film 7 is around 30 nm.

Figure 6:
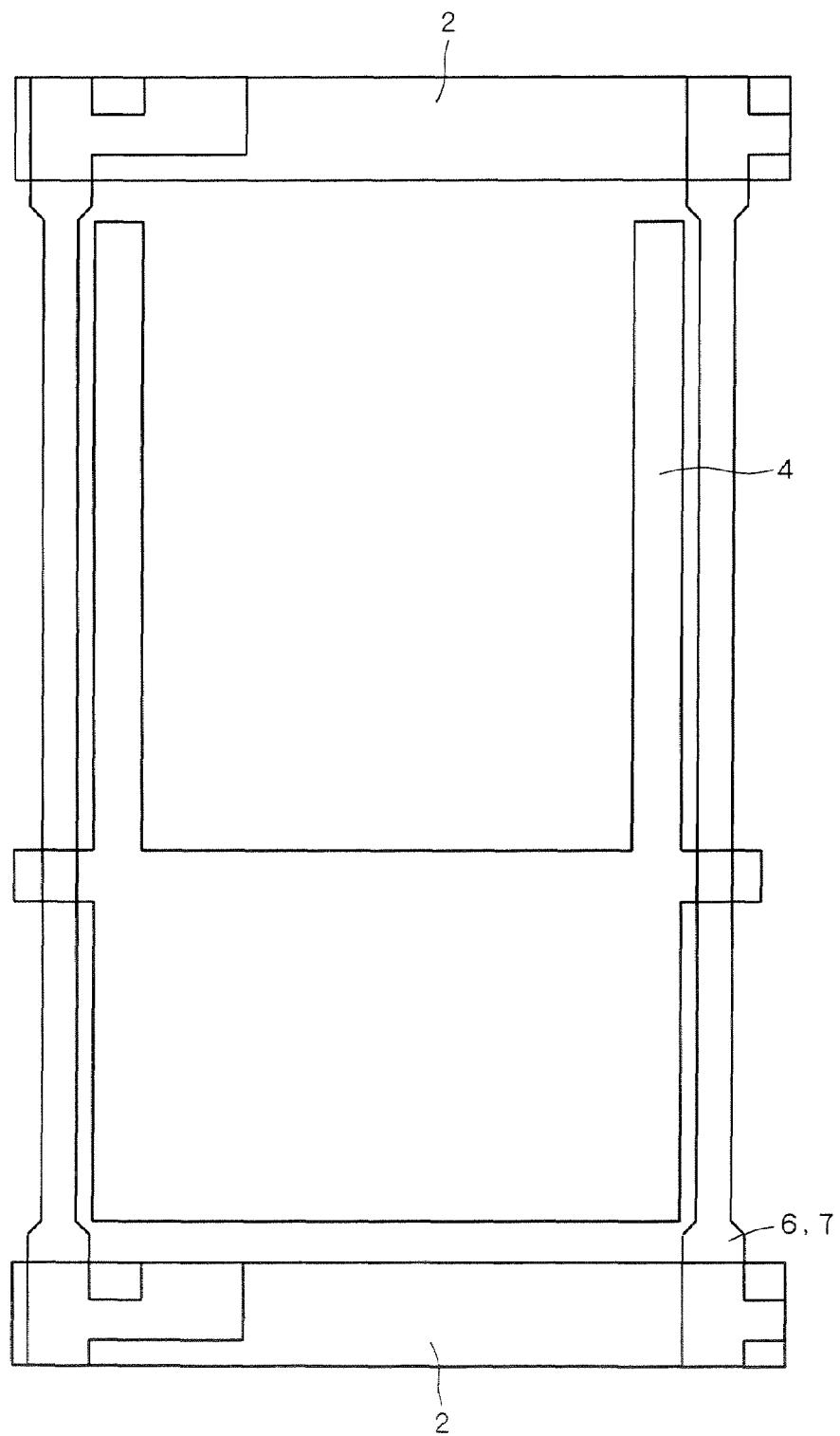
FIG. 6 is a plane view used to describe the method of manufacturing the transflective liquid crystal display device according to the first preferred embodiment.
Figure 7:
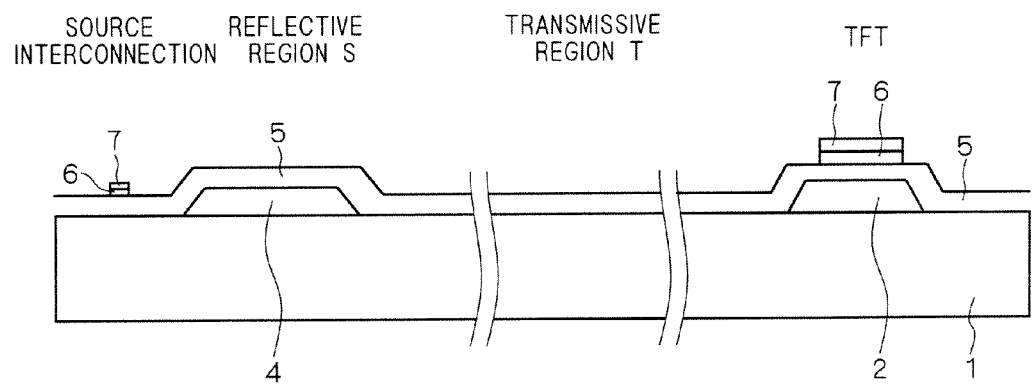
FIG. 7 is a cross-sectional view used to describe the method of manufacturing the transflective liquid crystal display device according to the first preferred embodiment.

Then, a photolithography process is applied to the films 6 and 7 to pattern the semiconductor active film 6 and the ohmic contact film 7 into a given pattern as shown in the plane view of FIG. 6 and the cross-sectional view of FIG. 7.

In this process, the semiconductor active film 6 and the ohmic contact film 7 are patterned into predetermined shape so that the semiconductor active film 6 and the ohmic contact film 7 remain in the TFT formation area, at least. The semiconductor active film 6 and the ohmic contact film 7 may be patterned so that the films 6 and 7 remain not only in the TFT formation region but also in the areas where the gate bus lines 2 and the source bus lines 3 intersect with each other and the areas where the source bus lines 3 are formed.

Leaving the semiconductor active film 6 and the ohmic contact film 7 remaining in the areas for the source bus lines 3 and the like increases the breakdown voltage of the components during operation.

The patterning of the semiconductor active film 6 and the ohmic contact film 7 may be achieved by dry-etching using a known gaseous composition (e.g., a mixed gas of $SF_6$ and $S_2$ or a mixed gas of $CF_4$ and $O_2$).

Next, a sputtering process, for example, is applied to the transparent insulative film 1 on which the components (the semiconductor active film 6, the ohmic contact film 7, etc.) have been formed as explained above. The second conductive film is thus formed over the transparent insulative film 1.

Figure 9:
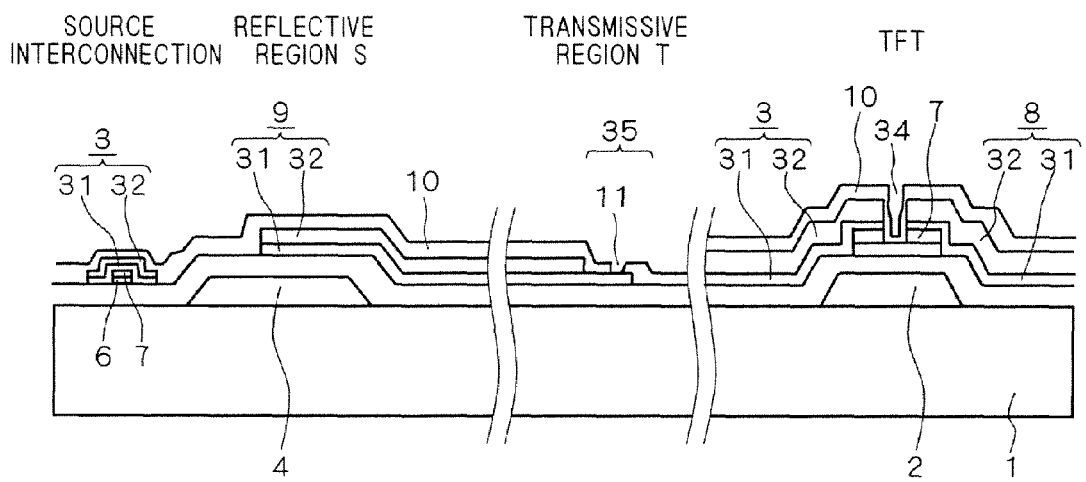
FIG. 9 is a cross-sectional view used to describe the method of manufacturing the transflective liquid crystal display device according to the first preferred embodiment.

The second conductive film may be a two-layered film as shown in FIG. 9, for example. When the second conductive film is thus two-layered, the first thin film layer 31 may be made of chromium, molybdenum, tantalum, or titanium, or an alloy mainly containing any of these elements, for example. The second thin film layer 32 formed on the first thin film layer 31 may be made of aluminum or silver, or an alloy mainly containing such elements, for example.

The first thin film layer 31 is formed directly on the ohmic contact film 7 and the insulating film 5. The second thin film layer 32 is formed directly on the first thin film layer 31 as mentioned above.

As will be described later, the second conductive film is used as the source bus lines 3, drain electrodes 8, reflective electrodes 9, and the like. It is therefore necessary to form the second conductive film by considering bus line resistance and reflectivity characteristic of the surface layer. Considering these factors, the second conductive film is preferably formed of a first thin film layer 31 made of chromium and having a thickness of about 100 nm, and a second thin film layer 32 made of AlCu and having a thickness of about 300 nm. For the sake of simplicity, the description below shows an example that uses a conductive film formed in this manner.

Figure 8:
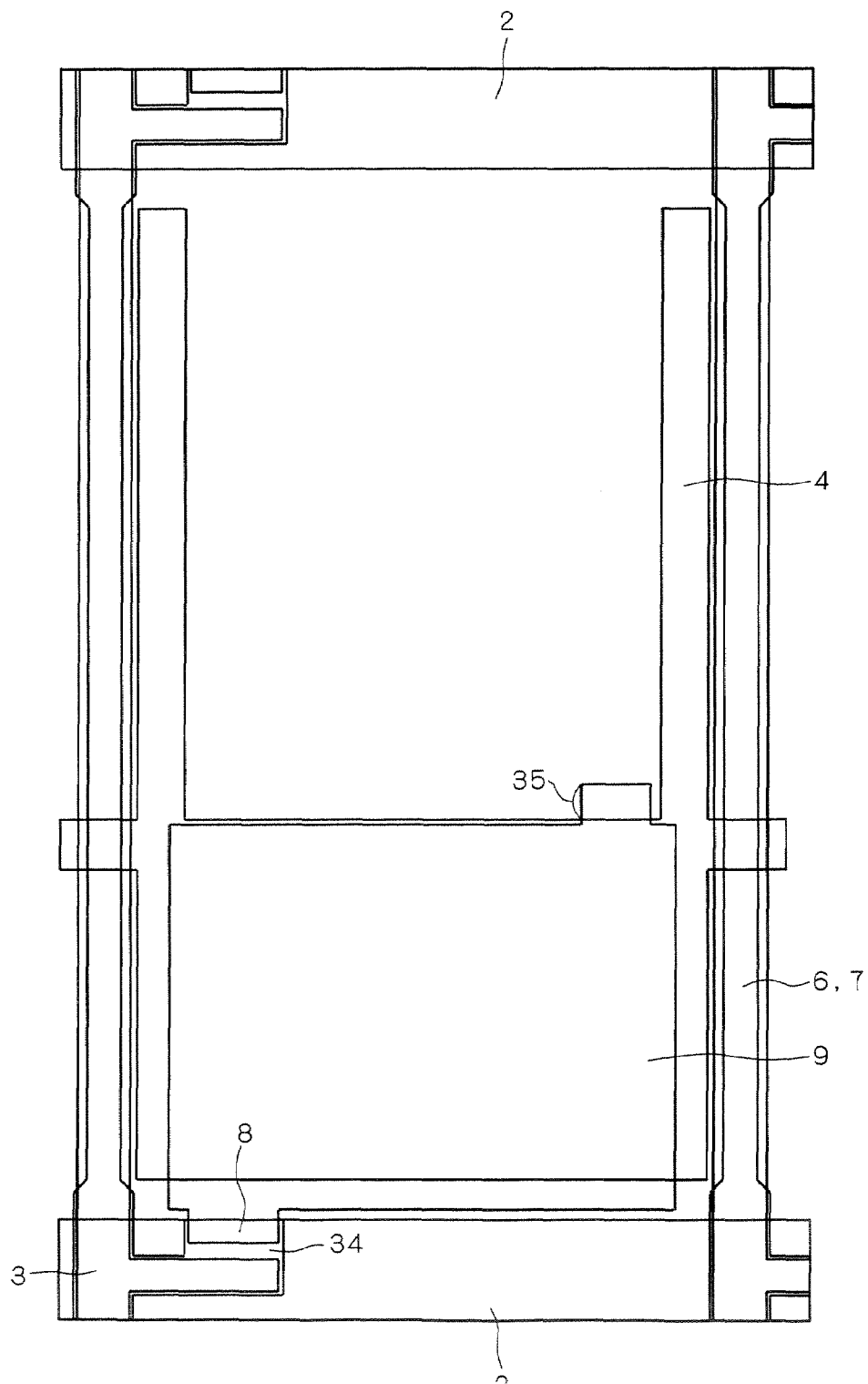
FIG. 8 is a plane view used to describe the method of manufacturing the transflective liquid crystal display device according to the first preferred embodiment.

Next, a photolithography process is applied to the second conductive film to pattern the second conductive film into predetermined shape. The second conductive film is thus formed into the source bus line 3, drain electrode 8, and reflective electrode 9, as shown in FIGS. 8 and 9.

As mentioned earlier, the drain electrode 8 and the reflective electrode 9 are formed as one piece. That is, the drain electrode 8 and the reflective electrode 9 continue in the same layer. It is clear from this structure that the drain electrode 8 and the reflective electrode 9 are electrically connected to each other in the same layer.

Also, as mentioned earlier, the reflective electrode 9 is formed in the reflective region S in the same layer as the source bus lines 3. The source bus lines 3 and the reflective electrode 9 are separated by the given spaces (distances).

The etching of the second conductive film may be achieved by wet-etching using a known etchant.

Next, in the area 34 that divides the drain electrode 8 and the source electrode in the TFT formation region (see FIGS. 8 and 9), the ohmic contact film 7 is partially removed by etching. The semiconductor active film 6 is thus exposed in the area 34.

The partial removal of the ohmic contact film 7 may be performed during the photolithography process of the second conductive film, by dry-etching using a known gaseous composition (for example, a mixed gas of $SF_6$ and $O_2$ or a mixed gas of $CF_4$ and $O_2$).

When the second conductive film is formed as a two-layered structure, the second thin film layer 32 of AlCu is partially removed in the area 35 for the formation of the contact hole 11 described later (see FIGS. 8 and 9). A contact area is thus formed in the area 35. The partial removal of the second thin film layer 32 may be achieved by a method described below.

For instance, during the photolithography process performed to pattern the source bus lines 3, drain electrode 8, reflective electrode 9, and the like, an exposure technique such as half-tone exposure is used so that the photoresist is formed thinner in the area 35. Then, after the dry-etching of the ohmic contact film 7 in the area 34, the photoresist film is thinned by using a technique such as oxygen plasma processing. The resist remaining in the area 35 is thus partially removed. Subsequently, using the photoresist as a mask, a wet-etching process is performed to partially remove the second thin film layer 32 of AlCu from the area 35.

In this way, in the area 35, only the first thin film layer 31 of chromium remains as the second conductive film (see FIG. 9).

The half-tone exposure process will be described in more detail.

In the half-tone exposure, the photoresist is exposed through a half-tone mask (for example, a mask of chromium having a predetermined pattern and desirably toned). Also, the intensity of exposure is controlled during the exposure process using the half-tone mask. This makes it possible to form given opening in the developed photoresist and to control (reduce) the finished film thickness in given area.

Subsequently, using the photoresist as a mask, the part exposed in the opening of the photoresist (the ohmic contact film 7 and the second conductive film in given area) is removed. Then, the thinned portion of the photoresist is removed by an oxygen plasma process, for example. Next, using as a mask the photoresist from which the thinned portion has been removed, the second thin film layer 32 is etched as described above.

The adoption of the half-tone exposure technique makes it possible to achieve the partial removal of the second thin film layer 32 in the area 35 in a single photolithography process together with the patterning of the source bus lines 3, drain electrode 8, and reflective electrode 9 and the partial removal of the ohmic contact film 7.

When the second conductive film is formed of the second thin film layer 32 of AlCu and the first thin film layer 31 of chromium, the second thin film layer 32 is partially removed from the area 35 for the purpose below. That is, the first thin film layer 31 (chromium film) providing good contact (good contact conductivity) with the transmissive electrode 12 is exposed through the contact hole 11 described later.

When the second conductive film is a thin film having a surface made of an aluminum nitride alloy (AlCuN), for example, then the surface reflectivity is somewhat lower than when the second conductive film is made of the stacked structure. However, the aluminum nitride alloy is capable of providing good contact with the transmissive electrode 12 described later. Accordingly, it is not necessary to apply the half-tone exposure to the photoresist when the second conductive film is a thin film having a surface of an aluminum nitride alloy (AlCuN), for example.

Next, the insulating film 10 is formed over the transparent insulative substrate 1, covering the source bus lines 3, drain electrode 8, reflective electrode 9, etc (see FIG. 9). The insulating film 10 may be formed by plasma CVD, for example.

Like the insulating film 5, the insulating film 10 may be a single-layered film of, e.g., SiNx, SiOy, or SiOzNw, or a multi-layered film including such films, for example. The characters "x", "y", "z", and "w" are positive numbers that represent stoichiometric compositions. Preferably, the thickness of the insulating film 10 is determined by considering the coverage of the underlying pattern. For example, a film of SiN having a thickness of about 500 nm may be adopted as the insulating film 10.

After the formation of the insulating film 10, a photolithography process is applied to the insulating film 10, and the contact hole 11 is formed in the insulating film 10 in the area 35. At the bottom of the contact hole 11, the first thin film layer 31, forming the layered reflective electrode 9, is exposed. The formation of the contact hole 11 may be achieved by wet-etching using a known etchant or by dry-etching using a known gas composition.

Next, a transparent conductive film is formed by, e.g., sputtering, over the transparent insulative substrate 1 having the insulating film 10 formed thereon. The transparent conductive film may be made of ITO (Indium Tin Oxide) or $SnO_2$, for example. Considering chemical stability, adopting ITO as the transparent conductive film is preferred. ITO may be crystalline ITO or amorphous (a-ITO). When a-ITO is adopted, it is necessary to heat it after the patterning at crystallization temperature (e.g., 180° C. or higher) to crystallize the a-ITO. Also, when a-ITO is adopted as the transparent conductive film, its film thickness is about 80 nm.

Next, a photolithography process is applied to the transparent conductive film to pattern the transparent conductive film into given shape as shown in FIGS. 2 and 3. More specifically, as shown in FIGS. 2 and 3, the transmissive electrode 12 and the reflective contrast reduction preventing electrodes 13 are formed in given shape. The reflective contrast reduction preventing electrodes 13 are not connected to the transmissive electrode 12 and the like, and are in an electrically floating state.

As shown in FIG. 2, the transmissive electrode 12 is formed in the transmissive region T. Considering misalignment in the patterning of the transparent conductive film, the transmissive electrode 12 is formed to overlap the reflective electrode 9 (in plane view) in the vicinity of the border between the transmissive region T and the reflective region S, with the insulating film 10 existing between them.

When the transmissive electrode 12 and the reflective electrode 9 overlap in a large area in the reflective region S, it reduces the reflectivity of the reflective region S. Accordingly, it is preferred that the overlap of the transmissive electrode 12 and the reflective electrode 9 in the reflective region S is formed in a very limited area at the boarder between the reflective region S and the transmissive region T.

The transmissive electrode 12 fills the contact hole 11. That is, the transmissive electrode 12 is electrically connected to the reflective electrode 9 through the contact hole 11. The transmissive electrode 12 and the reflective electrode 9 are therefore at approximately the same potential.

The reflective contrast reduction preventing electrodes 13 are formed above the given spaces between the source bus lines 3 and the reflective electrode 9, and function to prevent reduction of reflective contrast in these given spaces. The reflective contrast reduction preventing electrodes 13 have areas overlapping the reflective electrode 9 in plane view, with the insulating film 10 existing between them.

As shown in FIG. 2, the reflective contrast reduction preventing electrodes 13 extend along the direction in which the source bus lines 3 extend. That is, the reflective contrast reduction preventing electrodes 13 and the source bus lines 3 are approximately parallel.

The reflective contrast reduction preventing electrodes 13 are formed from the vicinity of the edge of the reflective electrode 9 that is located near the border with the transmissive electrode 12 to the vicinity of a position corresponding to a border of a black matrix formed on the opposing substrate as described later (the border of the black matrix that is located on the TFT formation side).

The reflective contrast reduction preventing electrodes 13 have areas overlapping the storage capacitance electrode 4 in plane view, with the insulating films 5 and 10 existing between them.

As mentioned above, the reflective contrast reduction preventing electrodes 13 are in an electrically floating state. However, as mentioned above, the reflective contrast reduction preventing electrodes 13 have overlaps with the reflective electrode 9 in plane view with the insulating film 10 between them.

Accordingly, the reflective contrast reduction preventing electrodes 13 offer the effect to prevent reduction of reflective contrast in the given spaces between the source bus lines 3 and the reflective electrode 9 on the basis of the capacitance formed between the reflective contrast reduction preventing electrodes 13 and the reflective electrode 9.

That is, voltage can be applied between the opposing substrate and the reflective contrast reduction preventing electrodes 13 driven on the basis of the capacitance formed between the reflective electrode 9 and the reflective contrast reduction preventing electrodes 13. This allows application of an electric field to the liquid crystal layer above the given spaces, which prevents reduction of reflective contrast in the given spaces.

In this preferred embodiment, the transmissive electrode 12 and the reflective contrast reduction preventing electrodes 13 are formed from the same transparent conductive film during the same process. However, as mentioned earlier, the transmissive electrode 12 and the reflective contrast reduction preventing electrodes 13 are not electrically connected together and the reflective contrast reduction preventing electrodes 13 are in an electrically floating state.

Accordingly, the transmissive electrode 12 and the reflective contrast reduction preventing electrodes 13 may be formed of different materials in different processes. However, forming the members 12 and 13 with the same material (the same transparent conductive film) in the same process simplifies the manufacturing process.

Next, in the cell assembly process, an alignment layer is applied to the TFT array substrate 100 on which individual elements have been formed (the reflective electrodes 9, transmissive electrodes 12, reflective contrast reduction preventing electrodes 13, etc.). Subsequently, a rubbing process is applied to the TFT array substrate 100 in a given direction.

Next, a method of constructing the opposing substrate (regarded as a second substrate) will be described. The opposing substrate is placed opposite the TFT array substrate 100. The opposing substrate manufacturing method will be described without diagrams such as cross-sectional views showing the process steps.

First, a black matrix, for sectioning the pixel regions, is formed on a transparent insulative substrate (not shown, components of the opposing substrate are not shown in diagrams). Then, color filters are formed on the individual areas (pixel regions) sectioned by the black matrix.

Then, a protective film is formed to cover the color filters, and an opposing transparent electrode is formed on the protective film. An alignment layer is then applied to the opposing substrate on which the elements including the opposing transparent electrode have been formed. A rubbing process is then applied to the opposing substrate in a given direction.

The TFT array substrate 100 and the opposing substrate, with individual components formed thereon, are prepared in this way, and then the TFT array substrate 100 and the opposing substrate are placed on each other with the alignment layers facing each other. The TFT array substrate 100 and the opposing substrate are put on each other with a spacer (not shown) placed between them. The peripheries of the TFT array substrate 100 and the opposing substrate are bonded together with sealing material. A layer of liquid crystal is sandwiched between the TFT array 100 and the opposing substrate.

Polarizers are then bonded to both surfaces of the liquid crystal cell formed by placing the TFT array substrate 100 and the opposing substrate on each other. A backlight unit is then attached to the back surface, whereby the transflective liquid crystal display device of this preferred embodiment is completed.

In the transflective liquid crystal display device thus constructed, a transparent organic film may be formed on the opposing substrate in the areas opposite the reflective regions S of the TFT array substrate 100. This causes the thickness of the liquid crystal layer to be thinner in the reflective regions S than in the transmissive regions T. This approximately equalizes the electro-optic characteristics of the reflective regions S and the transmissive regions T, thereby enabling superior display.

As described above, in the transflective liquid crystal display device of this preferred embodiment, the reflective contrast reduction preventing electrodes 13 are formed to prevent reduction of reflective contrast in the given spaces, and the reflective contrast reduction preventing electrodes 13 are not connected to the transmissive electrode 12 and the like, and are in an electrically floating state.

Accordingly, even if the opposing electrode and a reflective contrast reduction preventing electrode are short-circuited because of conductive foreign matter entering between the reflective contrast reduction preventing electrode and the opposing electrode, or because of deformation of the opposing electrode caused during the manufacture, the transmissive electrode 12 and the opposing electrode are not electrically short-circuited (that is, inter-surface short-circuits are prevented).

That is, even when an electric short-circuit occurs between a reflective contrast reduction preventing electrode 13 and the opposing electrode, an electric field can be normally applied to the liquid crystal layer in the transmissive region T of the corresponding pixel region. This prevents formation of extremely noticeable defects called bright dot defects. In other words, the transflective liquid crystal display device of this preferred embodiment offers high yield.

The reflective contrast reduction preventing electrodes 13 allow application of voltage on the basis of the capacitance formed between the reflective contrast reduction preventing electrodes 13 and the reflective electrode 9. Accordingly, it is possible to apply a given voltage to the opposing electrode and the reflective contrast reduction preventing electrodes 13 even in the given spaces between the source bus lines 3 and the reflective electrode 9. This allows normal application of an electric field to the liquid crystal layer above the given spaces, preventing reduction of reflective contrast in the given spaces.

Second Preferred Embodiment

As above, a given voltage is applied to the reflective contrast reduction preventing electrode 13 on the basis of the capacitance formed between the reflective contrast reduction preventing electrode 13 and the reflective electrode 9.

On the other hand, as mentioned earlier, the transflective liquid crystal display device of the first preferred embodiment has the storage capacitance electrodes 4 that function to hold voltage for a given period. As shown in FIG. 3 etc., the storage capacitance electrode 4 overlaps the reflective contrast reduction preventing electrode 13 in plane view, with the insulating films 5 and 10 existing between them. That is, a capacitance is formed also between the storage capacitance electrode 4 and the reflective contrast reduction preventing electrode 13.

Accordingly, the value of the voltage applied to the reflective contrast reduction preventing electrode 13 varies depending on the capacitance ratio between the electric capacitance C1 formed between the reflective electrode 9 and the reflective contrast reduction preventing electrode 13 and the electric capacitance C2 formed between the storage capacitance electrode 4 and the reflective contrast reduction preventing electrode 13 (C1/C2). The variation of the voltage value appears as a variation of reflective contrast in the liquid crystal layer above the given space between the source bus line 3 and the reflective electrode 9. That is, the reflective contrast effect by the reflective contrast reduction preventing electrode 13 varies depending on variations of the capacitance ratio (C1/C2).

Figure 10:
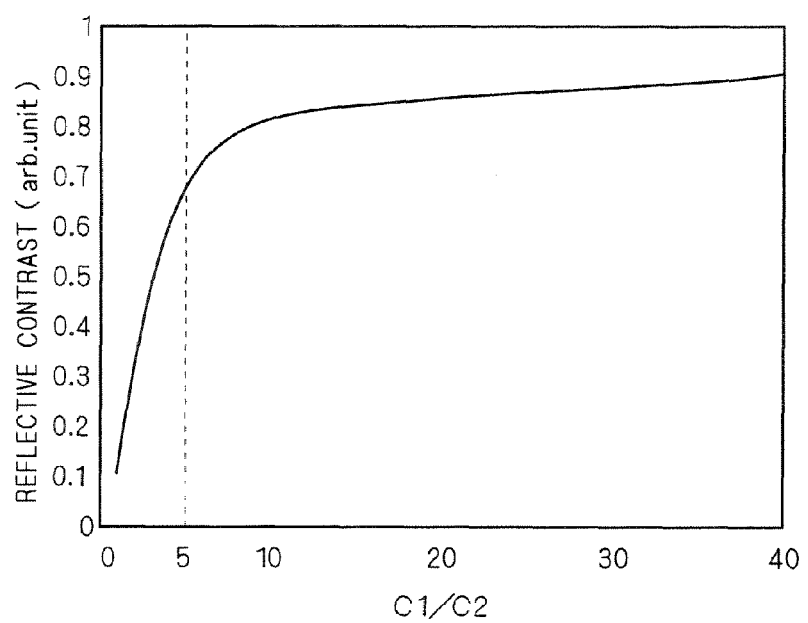
FIG. 10 is a diagram showing the results of a simulation illustrating a relation between a capacitance ratio and reflective contrast effect.

FIG. 10 shows the results of a simulation of the relation between the reflective contrast and the capacitance ratio (C1/C2) between the capacitance C1 and the capacitance C2. In FIG. 10, the vertical axis shows the reflective contrast (arb. unit) and the horizontal axis shows the capacitance ratio C1/C2. Larger values on the vertical axis showing the reflective contrast present superior reflective contrast.

First, when the value of the capacitance ratio C1/C2 is less than "5", it is known from FIG. 10 that the reflective contrast effect rapidly decreases (deteriorates) as the value of the capacitance ratio C1/C2 decreases (e.g., as the capacitance C1 decreases).

Next, when the capacitance ratio C1/C2 is "5" or higher, it is known from FIG. 10 that good reflective contrast effect is maintained even when the value of the capacitance ratio C1/C2 somewhat varies.

The capacitance ratio C1/C2 is given by the expression below:

$$C1/C2 = S1/S2 \times \{(\in 1 \cdot d2 + \in 2 \cdot d1)/\in 1 d2\} \quad (1)$$

In the expression (1), $\in 1$ s the dielectric constant of the insulating film 5, $\in 2$ is the dielectric constant of the insulating film 10, d1 is the thickness of the insulating film 5, d2 is the thickness of the insulating film 10, S1 is the area of the overlap of the reflective contrast reduction preventing electrode 13 and the reflective electrode 9, and S2 is the area of the overlap of the reflective contrast reduction preventing electrode 13 and the storage capacitance electrode 4.

As described above, it is preferable to make the capacitance ratio C1/C2 larger in order to maintain good reflective contrast effect without being considerably influenced even when the capacitance ratio C1/C2 somewhat varies (as mentioned above, C1/C2≧5 is preferable). Accordingly, the transflective liquid crystal display device of this preferred embodiment is designed so that the capacitance ratio C1/C2 is 5 or more.

For example, when a 400-nm-thick SiN film is adopted as the insulating film 5, a 500-nm-thick SiN film is adopted as the insulating film 10, and the area S2 is fixed at a desired value, then the value of the area S1 is enlarged (adjusted) so that the capacitance ratio C1/C2 is 5 or more.

It is known from the expression (1) that the value of the capacitance ratio C1/C2 is increased by enlarging the overlap area S1 of the reflective contrast reduction preventing electrode 13 and the reflective electrode 9, for example.

Preferably, attention is paid to the following factors in designing the transflective liquid crystal display device of this preferred embodiment.

Suppose that the area of the reflective contrast reduction preventing electrode 13 above the reflective electrode 9 is enlarged to increase the area S1. However, this increases the possibility of short-circuiting between the reflective contrast reduction preventing electrode 13 and the opposing electrode through, e.g., conductive foreign matter in the liquid crystal layer.

As described earlier, even if such a short-circuit occurs, voltage is normally applied to the transmissive electrode 12. Therefore, the corresponding pixel does not suffer a bright dot defect that would be caused by the passing through of the backlight. However, when such a short-circuit occurs, desired voltage cannot be applied to the reflective contrast reduction preventing electrode 13. Accordingly, when the area of the reflective contrast reduction preventing electrode 13 is observed with reflected light, that area is displayed (viewed) as a white point.

In this way, when the area of the reflective contrast reduction preventing electrode 13 located above the reflective electrode 9 is unnecessarily enlarged, the possibility of occurrence of a short-circuit between the reflective contrast reduction preventing electrode 13 and the opposing electrode increases, and a white point will more likely be observed. Consequently, it is preferable to somewhat limit the enlargement of the area of the reflective contrast reduction preventing electrode 13 above the reflective electrode 9.

For example, the inventors of the present invention have confirmed that good reflective contrast effect is maintained and the occurrence of white points is reduced by adjusting the area S1 so that the value of the capacitance ratio C1/C2 is "7", when the insulating film 5 is made of a 400-nm-thick SiN film, the insulating film 10 is a 500-nm-thick SiN film, and the area S2 is fixed at a desired value.

As described so far, the transflective liquid crystal display device of this preferred embodiment is designed so that the capacitance ratio C1/C2 is 5 or more. This makes it possible to keep a stable, good reflective contrast effect with the reflective contrast reduction preventing electrodes 13.

Third Preferred Embodiment

Figure 11:
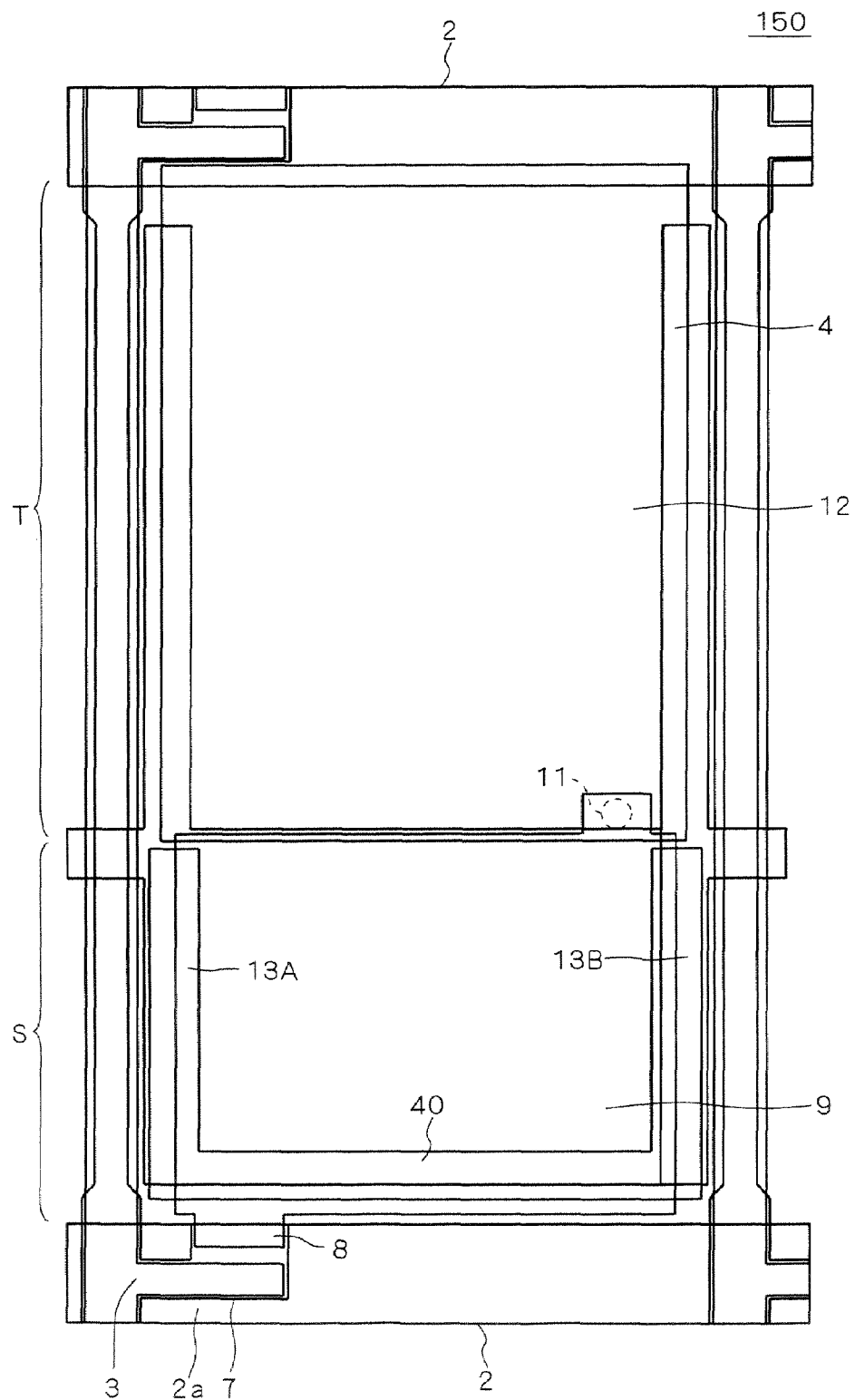
FIG. 11 is an enlarged plane view showing the structure of a TFT array substrate according to a third preferred embodiment.

FIG. 11 is a plane view showing the structure of a transflective liquid crystal display device according to a third preferred embodiment. The TFT array substrate 150 of this preferred embodiment is structured almost the same as the TFT array substrate 100 of the first preferred embodiment. However, the TFT array substrate 150 differs from the TFT array substrate 100 in the following respect.

The description below shows only the difference, and other common components are not described here again. In this preferred embodiment, the components of the transflective liquid crystal display device other than the TFT array substrate 150 are the same as those of the first preferred embodiment.

As shown in FIG. 11, in the reflective region S of one pixel region, the TFT array substrate 150 of this preferred embodiment further includes a connection electrode 40. The connection electrode 40 is a member that electrically connects reflective contrast reduction preventing electrodes 13A and 13B formed in the reflective region S. The reflective contrast reduction preventing electrodes 13A and 13B are formed respectively at the two sides of the reflective electrode 9 that face the source bus lines 3. This structure is described below in more detail.

In the reflective region S in the single pixel region, as shown in FIG. 11, one reflective contrast reduction preventing electrode 13A is positioned above the given space between a source bus line 3 and the reflective electrode 9 at one end of the reflective electrode 9. The other reflective contrast reduction preventing electrode 1 3B is positioned above the given space between a source bus line 3 and the reflective electrode 9 at the other end of the reflective electrode 9.

Now, "the other end" of the reflective electrode 9 is its end opposite to the "one end" of the reflective electrode 9. The reflective contrast reduction preventing electrode 13A and the reflective contrast reduction preventing electrode 13B are formed in the same layer.

As shown in FIG. 11, the TFT array substrate 150 of this preferred embodiment further includes the connection electrode 40 that electrically connects the reflective contrast reduction preventing electrode 13A and the reflective contrast reduction preventing electrode 13B. The width of the connection electrode 40 is about 5 μm, for example, and the connection electrode 40 is formed near the TFT formation area.

The shape and position of the connection electrode 40 are not particularly limited (for example, the width of the connection electrode mentioned above is not restrictive). However, it should be noted that the connection electrode 40 is not connected to the transmissive electrode 12 and the like, so that the reflective contrast reduction preventing electrodes 13A and 13B are kept in the electrically floating state.

Thus, the TFT array substrate 150 of this preferred embodiment, having the connection electrode 40, offers the effects below.

That is, the reflective contrast reduction preventing electrodes 13A and 13B are provided in the vicinities of the source bus lines 3 and in parallel with the source bus lines 3 in plane view. Accordingly, the reflective contrast reduction preventing electrodes 13A and 13B are susceptible to the influence of coupling noise from the source bus lines 3. When the reflective contrast reduction preventing electrodes 13A and 13B are affected by the coupling noise, crosstalk will be visually recognized in the reflective region S.

However, the TFT array substrate 150 of this preferred embodiment has the connection electrode 40 structured as described above. Specifically, for example, suppose that this preferred embodiment is applied to a transflective liquid crystal display device using a dot inversion driving system in which the polarity is inverted for each column and each row, or a column inversion driving system in which the polarity is inverted for each column. In such systems, the polarities of the right and left source bus lines 3 are inverted in opposite phases.

The provision of the connection electrode 40 cancels the coupling noise from the source bus lines 3 that the reflective contrast reduction preventing electrodes 13A and 13B suffer. This reduces crosstalk in the reflective region.

As mentioned above, the shape and position of the connection electrode 40 are not particularly restricted as long as the reflective contrast reduction preventing electrodes 13A and 13B are kept in a floating state. The materials of the reflective contrast reduction preventing electrodes 13A and 13B and the connection electrode 40 are not particularly limited, as long as the materials have conductivity. Also, while the connection electrode 40 is arranged approximately parallel to the gate bus line 2 in FIG. 11, this arrangement is not restrictive but the connection electrode 40 may be arbitrarily disposed as long as it is extended in a direction that intersects with the source bus lines 3.

However, when the connection electrode 40 is made of the same material as the reflective contrast reduction preventing electrodes 13A and 13B (that is, when the connection electrode 40 and the reflective contrast reduction preventing electrodes 13A and 13B are formed as one piece), the connection electrode 40 can be formed in the same process as the reflective contrast reduction preventing electrodes 13A and 13B. In this case, the connection electrode 40 and the reflective contrast reduction preventing electrodes 13A and 13B are formed as one piece.

Fourth Preferred Embodiment

Figure 12:
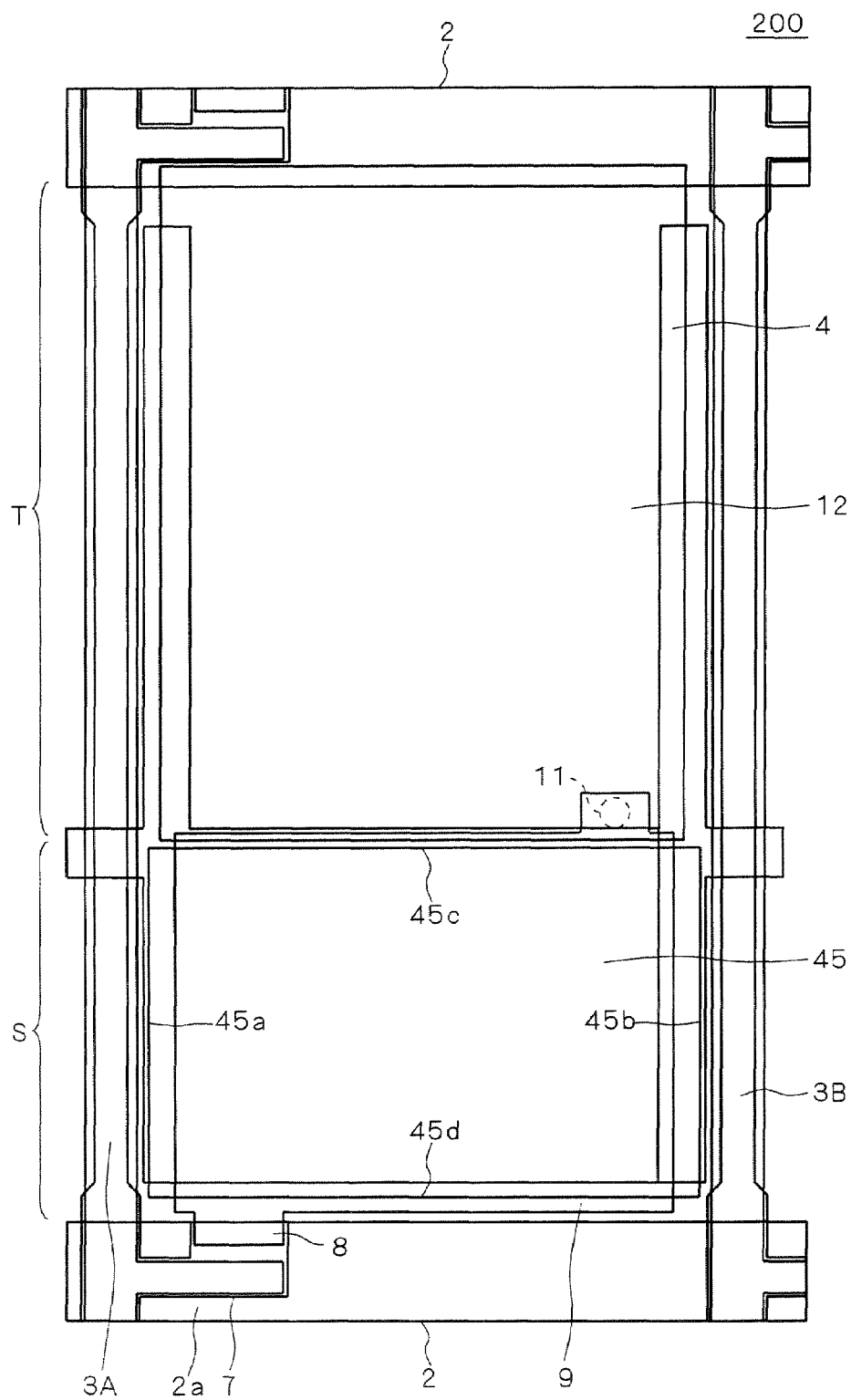
FIG. 12 is an enlarged plane view showing the structure of a TFT array substrate according to a fourth preferred embodiment.

FIG. 12 is a plane view showing the structure of a transflective liquid crystal display device according to a fourth preferred embodiment. The TFT array substrate 200 of this preferred embodiment is structured in almost the same manner as the TFT array substrate 100 of the first preferred embodiment. However, the TFT array substrate 200 differs from the TFT array substrate 100 in the following respect. The description below shows only the difference, and other common components are not described here again.

In this preferred embodiment, the components of the transflective liquid crystal display device other than the TFT array substrate 200 are the same as those of the first preferred embodiment.

In the reflective region S in one pixel region, a reflective contrast reduction preventing electrode 45 extends from one end of the reflective electrode 9 that faces a source bus line 3A to the other end that faces a source bus line 3B. That is, in the TFT array substrate 200 of this preferred embodiment, as shown in FIG. 12, the reflective contrast reduction preventing electrode 45 is formed from one end of the reflective electrode 9 to the opposite end of the reflective electrode 9. Also, the reflective contrast reduction preventing electrode 45 is formed to cover the reflective electrode 9 in plane view.

As shown in FIG. 12, in the reflective region S in that one pixel region, the reflective contrast reduction preventing electrode 45 is approximately rectangular with first to fourth sides in plane view.

The portion of the reflective contrast reduction preventing electrode 45 near its first side 45a is positioned above the given space between the source bus line 3A and the reflective electrode 9. The portion of the reflective contrast reduction preventing electrode 45 near its second side 45b is positioned above the given space between the source bus line 3B and the reflective electrode 9.

The third side 45c of the reflective contrast reduction preventing electrode 45 is positioned in the vicinity of the border between the reflective electrode 9 and the transmissive electrode 12. The fourth side 45d of the reflective contrast reduction preventing electrode 45 is positioned in the vicinity of the TFT formation area.

As described in the first preferred embodiment, the reflective contrast reduction preventing electrode 45 is in an electrically floating state.

As above, the TFT array substrate 200 of this preferred embodiment has the reflective contrast reduction preventing electrode 45 thus structured. This prevents crosstalk in the reflective region S in the manner described in the third preferred embodiment.

The transflective liquid crystal display devices of the preferred embodiments are applicable to active-matrix liquid crystal display devices such as office-automation equipment that display images and characters, for example.

While the invention has been described in detail, the foregoing description is in all aspects illustrative and not restrictive. It is understood that numerous other modifications and variations can be devised without departing from the scope of the invention.

What is claimed is:

1. The transflective liquid crystal display device comprising:
    a first substrate;
    a second substrate provided facing said first substrate, said second substrate including an opposing electrode; and
    a liquid crystal layer sandwiched between said first substrate and said second substrate,
    said first substrate comprising
    a plurality of gate bus lines formed on said first substrate;
    a plurality of source bus lines formed on said first substrate and intersecting with said gate bus lines in plane view;
    a reflective electrode formed in a reflective region that is a part of a unit pixel region sectioned by said gate bus lines and said source bus lines, said reflective electrode being formed in a same layer as said source bus lines and separated by given spaces from said source bus lines; and
    at least one reflective contrast reduction preventing electrode formed in an upper layer above said reflective electrode in said given spaces and overlapping said reflective electrode in plane view, with a first insulating film interposed therebetween,
    said reflective contrast reduction preventing electrode being in an electrically floating state.

2. The transflective liquid crystal display device according to claim 1, wherein said reflective contrast reduction preventing electrode extends in a direction in which said source bus lines extend.

3. The transflective liquid crystal display device according to claim 2, further comprising a storage capacitance electrode having a function of holding voltage for a given period and overlapping said reflective contrast reduction preventing electrode in plane view, with a second insulating film interposed therebetween, wherein, when an electric capacitance formed between said reflective electrode and said reflective contrast reduction preventing electrode is C1 and an electric capacitance formed between said storage capacitance electrode and said reflective contrast reduction preventing electrode is C2, then a relation $C1/C2 \geq 5$ is satisfied.

4. The transflective liquid crystal display device according to claim 2, wherein, in said reflective region, said at least one reflective contrast reduction preventing electrode includes reflective contrast reduction preventing electrodes formed respectively at both ends of said reflective electrode that respectively face said source bus lines, and said reflective contrast reduction preventing electrodes are electrically connected to each other through a connection electrode extending in a direction intersecting with said source bus lines.

5. The transflective liquid crystal display device according to claim 4, wherein said connection electrode is formed as one piece with said reflective contrast reduction preventing electrodes.

6. The transflective liquid crystal display device according to claim 1, wherein, in said reflective region, said reflective contrast reduction preventing electrode is formed to cover said reflective electrode in plane view from one end of said reflective electrode that faces one of said source bus lines to the other end of said reflective electrode that faces another one of said source bus lines.

* * * * *